United States Patent

[11] 3,556,397

| [72] | Inventor | David C. Andersen, Salt Lake City, Utah (4479 Rockland Place, Apt. 6, La Canada, Calif. 91011) |
|---|---|---|
| [21] | Appl. No. | 787,687 |
| [22] | Filed | Dec. 30, 1968 |
| [45] | Patented | Jan. 19, 1971 |

[54] CALCULATING DEVICE FOR TRIGONOMETRIC FUNCTIONS
9 Claims, 4 Drawing Figs.

[52] U.S. Cl. ............................................. 235/61, 33/76, 35/34
[51] Int. Cl. ............................................. G09b 23/04, G06g 1/00
[50] Field of Search ............................................. 235/61 Geo; 33/76, 90; 35/34, 30

[56] References Cited
UNITED STATES PATENTS

| 378,257 | 2/1888 | Leschorn | 33/90 |
| 570,157 | 10/1896 | Edmiston | 33/76 |
| 1,955,392 | 4/1934 | Shimberg | 33/76 |
| 2,736,491 | 2/1956 | Potter | 235/61 |
| 3,414,190 | 12/1968 | Lemiesz | 235/61 |

Primary Examiner—Stephen J. Tomsky
Attorney—C. Harvey Gold and David V. Trask

ABSTRACT: A trigonometric calculator with a circular degree scale on a scale member and a cursor member mounted to pivot on the scale member at the center of the degree scale. Coordinate axes with their origin at the center of the scale extend one unit length in each positive and negative direction and are calibrated from zero to one. Hairlines are mounted on the cursor member one unit length from the center of the degree scale for placement parallel the ordinate and abscissa axes. The sine and cosine functions may be directly read from the coordinate axes for any angle indicated by the cursor member on the degree scale. Other scales may be provided on either side of the scale member to indicate other trigonometric information relevant to the indicated angle.

INVENTOR.
DAVID C. ANDERSEN

BY C. Harvey Gold

ATTORNEY 3,556,397

CALCULATING DEVICE FOR TRIGONOMETRIC FUNCTIONS

BACKGROUND OF THE INVENTION

1. Field:

This invention relates to calculating devices and provides a trigonometric calculator of the circular slide rule-type. The trigonometric calculator of the invention finds application as a pocket calculator but is particularly useful as an instructional aid.

2. State of the Art:

Many types of hand-operated calculating devices are known. Several of these, such as those disclosed by U.S. Pats. Nos. 1,148,479; 1,346,273; 1,362,683; 1,409,303; and 2,452,662, incorporate circular, angle-indicating scales and cursor members of various types mounted to rotate around a pivot located at the center of the circular scale. Circular slide rules conventionally include concentric scales arranged such that the values of various trigonometric functions of an angle indicated by the intersection of a hairline with a degree scale are indicated by the concurrent intersections of the hairline with other scales.

While these devices are useful for those well acquainted with their operation, errors are regularly committed by those who are either unskilled or unfamiliar with them. They are not particularly suitable as instructional devices, in part because the trigonometric relationships involved are not displayed in a form that is readily discernible.

SUMMARY OF THE INVENTION

The calculating device of the present invention is suitable for use by relatively unskilled persons and is a useful instructional aid. It may be embodied in various forms but generally resembles other types of circular slide rules in appearance and operation. Thus, the claimed calculator includes as basic components: a scale member with an appropriately marked flat surface; a transparent, radial cursor member, pivotally mounted with respect to the scale member at one end to carry a radial indicator line; and indicating means pivotally mounted on the cursor member at a prescribed distance from the pivoted end of the cursor member. The indicating means carries two indicating lines and may be constructed as a second cursor member or pair of cursor members.

The scale member may be of any convenient size and shape, provided it includes a flat surface marked to display coordinate axes extending a prescribed unit length in both the positive and negative directions from their origin and a circular scale having its center at the origin of the coordinate axes such that the axes divide the area embraced by the scale into quadrants. The coordinate axes are linearly calibrated in conventional fashion from zero, at their origin, to one or minus one, as appropriate, one unit length removed from their origin. The circular scale is calibrated to indicate the angle of the arc measured thereon from its intersection with the positive side of the abscissa axis; i.e., to measure inscribed angles of zero to 360°. The circular scale may, of course, be calibrated to indicate degrees, radians, or both.

Preferably, the coordinate axes are superimposed on a grid of intersecting parallel guide lines with one set of parallel lines normal the ordinate axis and a second set of parallel lines normal the abscissa axis. If the angle scale is a unit circle, the grid lines will directly indicate the values of the sine and the ordinate axis and the cosine on the abscissa axis for the angles intersected by the grid lines on the angle scale. It is usually preferred that the angle scale have a larger radius, however, and that a separate unit circle be marked on the scale member concentric with the angle scale. A radial hairline intersecting the angle scale also intersects the unit circle thereby selecting the grid lines which intersect the coordinate axes at values closest to the sine and cosine values, respectively, of the inscribed angle. The indicating means described hereinafter are used to interpolate between grid lines.

The radial cursor member is pivotally mounted on the scale member at the origin of the coordinate axis. This cursor member carries a radial hairline indicator of sufficient length to intersect the circular angle-indicating scale thereby indicating the magnitude of the inscribed angle In the preferred form of the calculator of this invention, the scale member is in the form of a flat circular disc with a radius slightly larger than that of a unit circle; i.e., a circle with a radius equal to one unit length on the coordinate axes. The angle-indicating scale is desirably at or near the perimeter of the scale member. The scale member preferably has two flat sides, each of which is marked with circular scales calibrated to indicate trigonometric information relevant to the inscribed angle indicated on the angle scale. The cursor member may then include two radial arms straddling the disc to pivot from its center. The arms may be connected at their unpivoted ends outside the perimeter of the disc. Each arm may carry a radial hairline indicating line. When the radial hairline carried by one transparent cursor arm is set at a prescribed angle, as indicated on a circular angle scale, trigonometric information, such as any of the trigonometric functions of the inscribed angle or its complementary or supplementary angle, may be read directly from appropriately calibrated circular scales on the opposite side of the scale member. It is often desired to include a circular tangent scale concentric to the angle-indicating scale so that the primary trigonometric functions; i.e., sine, cosine, and tangent, of the inscribed angle may be read simultaneously on one side of the scale member.

For increased accuracy and for instructional display purposes indicating means are provided near the sweeping end; i.e., the end opposite the pivoted end, of the cursor member. The indicating means carry two hairlines or guide lines for placement to intersect the abscissa and ordinate axes. The indicating means is attached to the cursor member on the radial indicating hairline such that the hairlines carried thereby pivot from a location one unit length from the origin of the axis. The hairlines are positioned parallel to the grid lines to intersect the respective axes, thereby to determine the values of the sine and cosine functions. When thus positioned, the hairlines of the indicating means and the radial hairline carried by the cursor member display the fundamental trigonometric triangle. This triangle includes the inscribed angle of interest. The hairlines also display the complementary right triangle. When the unit circle is marked on the scale, as previously described, the relationships of the fundamental and complementary triangles to the unit circle of trigonometry are displayed visually. Such a display is an excellent instructional aid.

The hairlines of the indicating means may be embodied in various structures. For example, each hairline may be carried by a transparent cursor arm pivotally connected at the sweeping end of the radial cursor member. It is generally preferred that the hairlines be permanently set at a right angle to each other; e.g., as intersecting lines marked on a transparent circular disc. According to one embodiment, the indicating means comprises a quarter disc, pivotally connected to the radial cursor member such that the edges thereof function as guide lines.

DESCRIPTION OF THE DRAWINGS

In the drawings, which illustrate what is presently considered to be the best mode for carrying out the invention.

DESCRIPTION OF THE ILLUSTRATED EMBODIMENTS

Figure 1:
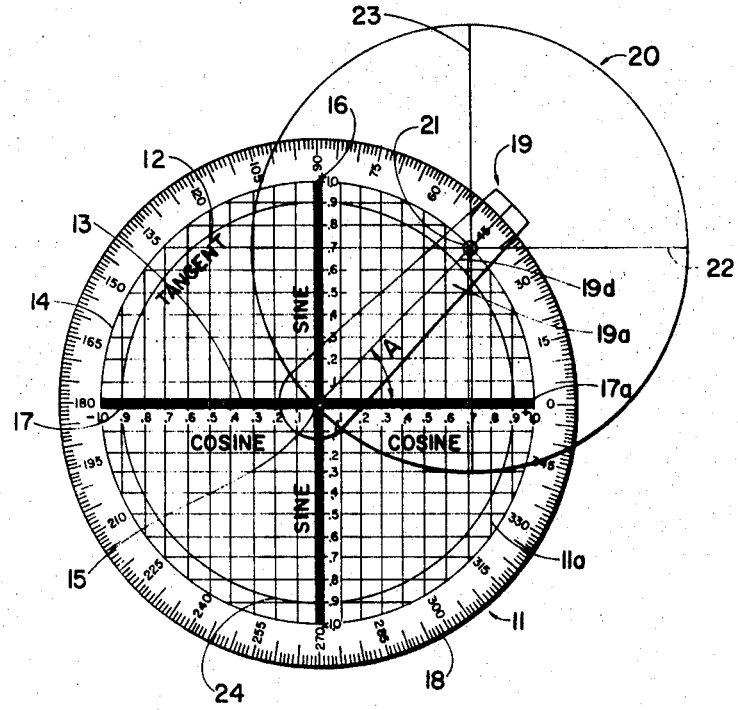
FIG. 1 is a front view, in elevation, of the trigonometric rule of this invention.
Figure 2:
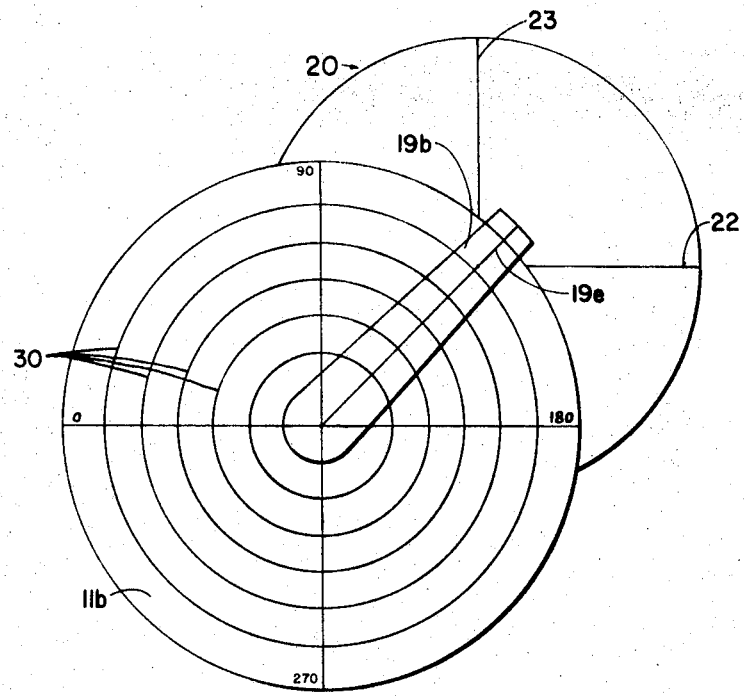
FIG. 2, a back view, in elevation.
Figure 3:
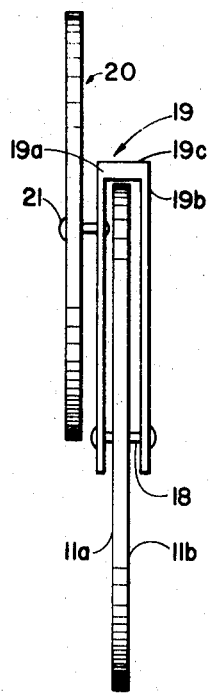
FIG. 3, a side view, in elevation.

The trigonometric rule illustrated by FIGS. 1 through 3 comprises a flat circular disc 11 printed on one side 11a (FIG. 1) with a grid 12 of parallel guide lines and coordinate axes 13. The axes and grid are contained within a circle 14 having its center at the origin 15 of the axes. The circle 14 thus constitutes the unit circle of trigonometry and is divided into quadrants by the coordinate axes 13. The ordinate axis 16 and the abscissa axis 17 each extend one unit length from the origin as radii of the unit circle. The diameter of the disc 11, is sufficiently greater than the diameter of the unit circle to accommodate a circular degree scale 18 on the perimeter of the disc outside the unit circle. The degree scale is calibrated from zero to 360° to indicate the inscribed angle of any arc measured around the perimeter of the disc from the intersection of the positive side of the abscissa axis 17a with the unit circle 14.

The coordinate axes are calibrated from zero of their origins to one or minus one, depending upon the coordinates of the axes, as illustrated. The lines of the grid 12, intersect the coordinate axes at linear intervals.

A transparent cursor member 19 is pivotally mounted at the center 15 of the disc. The cursor has two arms 19a and 19b (FIG. 3) which straddle the disc 11 and are pivotally connected through its center 15 to corresponding opposite sides 11a and 11b as shown. The arms are connected at their sweeping end 19c outside the perimeter of the disc 11. Each of the transparent legs of the cursor member 19 carries a radial-indicating hairline 19d and 19e, respectively, sufficient in length to intersect the circular scales marked on the disc.

The side 11b of the disc opposite the side 11a imprinted with the degree scale 18 is imprinted with circular scales 30 calibrated to indicate trigonometric information, such as versines, coversines, haversines, natural functions, or other information relevent to the angle indicated on the circular degree scale or its complementary, supplementary or other related angles.

A transparent, indicating disc 20 with a radius of approximately one unit length is pivotally connected at its center 21 to the outer surface of the leg 19a of the cursor member 19 on the radial-indicating line 19d at a distance one unit length from the center of the unit circle 14. Thus, as the cursor member 19 is rotated around the perimeter of the disc 11, the pivot connection 21 traces the circumference of the unit circle 14. The transparent disc 20 is marked with normally intersecting diametric hairlines 22 and 23. These hairlines may be oriented parallel the grid lines to intersect the ordinate and abscissa axes for any desired setting of the cursor member 19. In this fashion, the sine and cosine functions of any inscribed angle A may be read directly. A tangent scale 24 is provided as shown for intersection by the radial hairline 19d to indicate the value of the tangent of the inscribed angle.

The 3 embodiment is particularly useful for instructional purposes because it displays fundamental and complementary trigonometric right triangles for any given inscribed angle within the unit circle of trigonometry. Thus, for classroom purposes, the discs 11 and 20 may be several feet in diameter, in which case the trigonometric functions may be readily determined to 3 place accuracy. Smaller models, capable of two place accuracy, are useful pocket-calculating devices.

The use of the trigonometric rule is illustrated by FIGS. 1, 2, and 3. The radial hairline indicator 19 is set to intercept 45° on the circular degree scale 18 as illustrated. Hairline 22 is then placed parallel the horizontal guidelines as shown to intersect the ordinate axis. Hairline 23 is thereby automatically brought normal to the abscissa axis. The value of the sine of 45° is then read directly from the linear scale on the ordinate axis while the value of the cosine of 45° is read directly from the intersection of line 23 with the linear scale on the abscissa axis. The value of the tangent of 45° is read directly from the tangent scale at the intersection of the radial hairline therewith. Other trigonometric values are simultaneously indicated on the reverse side 11b of the scale member disc 11. When the inscribed angle A is sufficiently large that the radial hairline is in one of the other quadrants, the proper signs of the sine and cosine functions are obvious.

Figure 4:
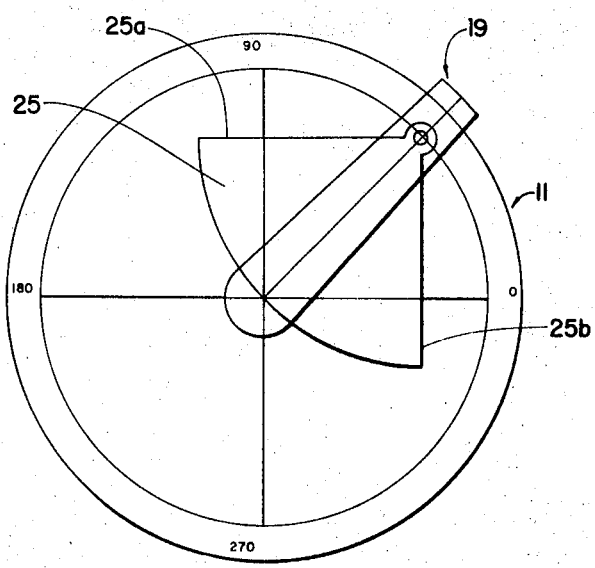
FIG. 4, a front view, in elevation, of an alternative form of the invention.

FIG. 4 illustrates an alternative embodiment wherein the transparent disc 20 is replaced by a quarter segment 25 of a transparent disc. The edges 25a and 25b function as guides for interpolating values of the sine and cosine between adjacent intersections of the grid lines and axes. This embodiment is more convenient for pocket use and is representative of a member of modifications which may be made to the calculating device of this invention without departing from the inventive features thereof. Reference herein to details of the illustrated embodiments is not intended to restrict the scope of the claims which recite those features regarded as essential to the invention.

I claim:

1. A calculating device for determining the values of trigonometric functions, comprising:
   a scale member with a flat surface marked to display coordinate axes linearly calibrated from zero at their origin to 1, one unit length from their origin and a circular angle-indicating scale, having its center at the origin of said axes, such that the axes divide the area embraced by the scale into quadrants, said scale being calibrated to indicate the inscribed angle of any arc measured thereon from its intersection with the positive side of the abscissa axis of said coordinate axes;
   a transparent cursor member pivotally mounted on the scale member at the origin of said axes carrying a radial indicator line of at least one unit length which extends from the origin to intersect said circular scale; and
   indicating means, mounted on the cursor member, including two reference lines fixed at right angles to each other and extending from a location on the radial indicator line one unit length from the origin of said axes, adapted for alignment parallel the axes to intersect the ordinate and abscissa axes, respectively, thereby to indicate directly the values of the sine and cosine, respectively, of said inscribed angle.

2. A calculating device according to claim 1, wherein the coordinate axes are superimposed on a grid of intersecting parallel guide lines with one set of parallel lines normal the ordinate axes and a second set of parallel lines normal the abscissa axis so as to intersect the ordinate and abscissa axes, respectively, at linear intervals across unit lengths of both the positive and negative sides thereof, measured from the origin of the axes.

3. A calculating device according to claim 1, including a second circular scale with its center at the origin of said axes, located for intersection by said radial hairline and calibrated to indicate the value of the tangent of said inscribed angle.

4. A calculating device according to claim 1, wherein the scale member is a circular disc.

5. A calculating device according to claim 4, wherein the circular scale has a radius greater than one unit length.

6. A calculating device according to claim 4, wherein the cursor member includes two transparent radial arms which straddle the scale member and are connected outside the circumference of the scale member so that they pivot in tandem; the surface of the scale member opposite the aforedescribed marked surface is marked with at least one circular scale calibrated to indicate trigonometric information relevant to said inscribed angle; and each radial arm carries a radial hairline to intersect the circular scales marked on the respective surfaces of the scale member.

7. A calculating device according to claim 6, wherein the indicating means includes two hairlines marked on transparent backing pivotally mounted to said cursor member so that said hairlines, radial-indicating line, and axes, display the fundamental trigonometric triangle of interest and its complementary right triangle.

8. A calculating device according to claim 7, wherein a unit circle, with its center at the origin of the axes, is marked on the scale member such that for each setting of the cursor member, the fundamental and complementary right triangles are displayed within said unit circle.

9. A calculating device according to claim 7, wherein the indicating means comprises a transparent disc with a radius of approximately one unit length pivotally mounted at its center to said cursor member and marked with normally intersecting diametric hairlines.